(12) United States Patent
Blumenau

(10) Patent No.: US 6,510,462 B2
(45) Date of Patent: Jan. 21, 2003

(54) COLLECTION OF IMAGES IN WEB USE REPORTING SYSTEM

(75) Inventor: Trevor Blumenau, Redwood City, CA (US)

(73) Assignee: Nielsen Media Research, Inc., Schaumburg, IL (US)

(*) Notice: Subject to any disclaimer, the term of this patent is extended or adjusted under 35 U.S.C. 154(b) by 0 days.

(21) Appl. No.: 09/145,090

(22) Filed: Sep. 1, 1998

(65) Prior Publication Data

US 2002/0002595 A1 Jan. 3, 2002

(51) Int. Cl.[7] .................................................. G06F 15/173
(52) U.S. Cl. .................................... 709/224; 707/203
(58) Field of Search .................................. 709/224, 200, 709/206, 217, 229, 228, 216, 202, 218, 245; 707/511, 501, 6; 711/137, 131; 705/26–27

(56) References Cited

U.S. PATENT DOCUMENTS

| | | | | |
|---|---|---|---|---|
| 5,388,255 A | * | 2/1995 | Pytlik et al. ................. | 395/600 |
| 5,675,510 A | | 10/1997 | Coffey et al. ............ | 709/224.2 |
| 5,796,952 A | | 8/1998 | Davis et al. ................ | 709/224 |
| 5,799,292 A | * | 8/1998 | Hekmatpour ................ | 706/11 |
| 5,842,216 A | * | 11/1998 | Anderson et al. ........... | 707/203 |
| 5,864,837 A | * | 1/1999 | Maimone ........................ | 707/1 |
| 5,898,836 A | * | 4/1999 | Freivald et al. ............. | 709/218 |
| 5,903,723 A | * | 5/1999 | Beck et al. .................. | 709/200 |
| 5,923,846 A | * | 7/1999 | Gage et al. .................. | 709/213 |
| 5,944,780 A | * | 8/1999 | Chase et al. ................. | 709/201 |
| 5,951,642 A | * | 9/1999 | Onoe et al. .................. | 709/202 |
| 5,961,582 A | * | 10/1999 | Gaines .......................... | 709/1 |
| 5,978,842 A | * | 11/1999 | Noble et al. ................. | 709/218 |
| 6,006,217 A | * | 12/1999 | Lumsden ....................... | 707/2 |
| 6,014,698 A | * | 1/2000 | Griffiths ...................... | 709/224 |
| 6,018,619 A | * | 1/2000 | Allard et al. ................ | 709/224 |
| 6,038,601 A | * | 3/2000 | Lambert et al. ............ | 709/226 |
| 6,047,126 A | * | 4/2000 | Imai ............................ | 395/710 |
| 6,212,565 B1 | * | 3/2001 | Gupta ......................... | 709/229 |

\* cited by examiner

Primary Examiner—Mark H. Rinehart
Assistant Examiner—Bunjob Jaroenchonwanit
(74) Attorney, Agent, or Firm—Katten Muchin Zavis Rosenman

(57) ABSTRACT

A checksum is extracted from an image downloaded to a content recipient. The content recipient transmits the extracted checksum to a data collection site. The data collection site compares the received checksum to a reference checksum. If the received checksum and the reference checksum match, the data collection site uses an image corresponding to the reference checksum as the downloaded image. If the received checksum and the reference checksum do not match, the data collection site retrieves the downloaded image from the content recipient.

36 Claims, 7 Drawing Sheets

COLLECTION OF IMAGES IN WEB USE REPORTING SYSTEM

TECHNICAL FIELD OF THE INVENTION

The present invention relates to an arrangement for collecting images that are viewed by content recipients so that Web use reporting may include copies of images.

BACKGROUND OF THE INVENTION

The Internet has proven to be an efficient and popular mechanism for the dissemination of content from content providers to content recipients. Content providers in many cases are organizations, such as businesses, governmental agencies, educational institutions, and the like, who operate Web sites in order to offer content that can be downloaded by content recipients. The content recipients are often consumers who use computers typically located in their dwellings in order to access the content offered by content providers. However, content recipients may also be other businesses, governmental agencies, educational institutions, and the like, and in many cases, a content provider is also a content recipient.

Content is typically provided directly by a Web site to content recipients. However, in many instances, additional information is accessible from one Web site by way of click-through URLs contained in the content directly provided by another Web site. Also, content provided by content providers to content recipients either directly, or indirectly through click-through URLs, frequently includes IMAGES such as advertisements in which organizations advertise their goods and/or services.

The operators of Web sites offering content such as advertisements to content recipients, as well as those who create and place such content as offerings by Web sites, generally desire information about Web use. This information includes the number of times that the content is accessed, the amount of exposure of the content, the demographics of those who access the content, and the like. Web site owners, and those who create and place content, may then draw market relevant conclusions from this Web use information.

Several arrangements have been proposed as attempts to acquire Web use information. For example, it is known for a Web site to itself measure the number of times that content recipients access its content offerings. However, such an arrangement provides little information about exposure and demographics. Also, this measurement at a single Web site provides little information with respect to the content offered by other Web sites, such as competitive Web sites. Moreover, even if measurements are made at a plurality of Web sites, it is difficult to extrapolate the resulting data over relevant segments of the population.

Therefore, it has also been proposed to install software meters on the computers of panelists so that access, exposure, and demographic information relative to the content downloaded by the panelists can be measured and extrapolated over the population as a whole, in much the same way that TV ratings are generated. According to this proposal, the software meters track operating system messages in order to detect communications of interest. When the software meters detect communications of interest, the software meters log the titles of the corresponding windows which are displayed to a computer user because Internet content, as well as application software interfaces, are typically provided to the user in a window format. However, logging titles of windows is not particularly useful because such titles can be very generic. For example, one such title which is popular with many content providers is simply "Home Page." This title provides little indication of the information supplied to the content recipient.

Tagging of Internet content has been broadly suggested in the context of requiring widespread industry cooperation. However, it is unlikely that such widespread industry cooperation is attainable.

In addition, known arrangements which collect information, particularly survey information, relative to content offered by Web sites are not able to accurately determine the specific content that is accessed by panelists at any particular time because the content changes depending upon the class of content recipient, the type of browser used by the content recipient, the time of day, the day of the month, the month of the year, and so on. Moreover, many of those who are provided Web use information request that copies of the accessed content be included in the reported Web use information.

The present invention accurately determines the specific content that is accessed by panelists and is able to access that content for inclusion in reports of Web usage.

SUMMARY OF THE INVENTION

In accordance with one aspect of the present invention, a data collection server is arranged to collect Web use data from a panel of content recipients. The Web use data is of the type that provides a statistical basis for extrapolating the Web use data over at least a relevant population segment, and the Web use data includes information about use of an image downloaded from a Web site to a member of the panel. The data collection server is arranged to retrieve the image from the member of the panel.

In accordance with another aspect of the present invention, a method of metering web use comprises the following steps: a) retrieving, from a content recipient, information identifying an image downloaded from a Web site to the content recipient; and b) retrieving the image based upon the identifying information.

In accordance still another aspect of the present invention, a method performed at a content recipient comprises the following steps: a) receiving an image from a Web site; b) extracting a checksum from the image; c) transmitting the checksum to a data collection site; and d) transmitting the image to the data collection site in response to a message from the data collection site indicating that the content recipient should transmit the image.

In accordance with yet another aspect of the present invention, a method performed at a data collection site comprises the following steps: a) receiving a checksum from a content recipient, wherein the checksum is related to an image transmitted to the content recipient; b) comparing a reference checksum to the received checksum; c) if the received and reference checksums do not match, transmitting to the content recipient a message from the data collection site indicating that the content recipient should transmit the image; and, d) receiving the image from the content recipient in response to step c).

In accordance with a further aspect of the present invention, a method performed at a data collection site comprises the following steps: a) receiving a first checksum and a URL from a content recipient, wherein the first checksum and the URL are related to a first image transmitted to the content recipient; b) retrieving a second image from a Web site based upon the URL; c) computing a second checksum corresponding to the second image; d) saving the second image in connection with the content recipient if the first and second checksums match; e) transmitting to the content recipient a request for the first image if the first and second checksums do not match; and, f) receiving the first image from the content recipient in response to step e).

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
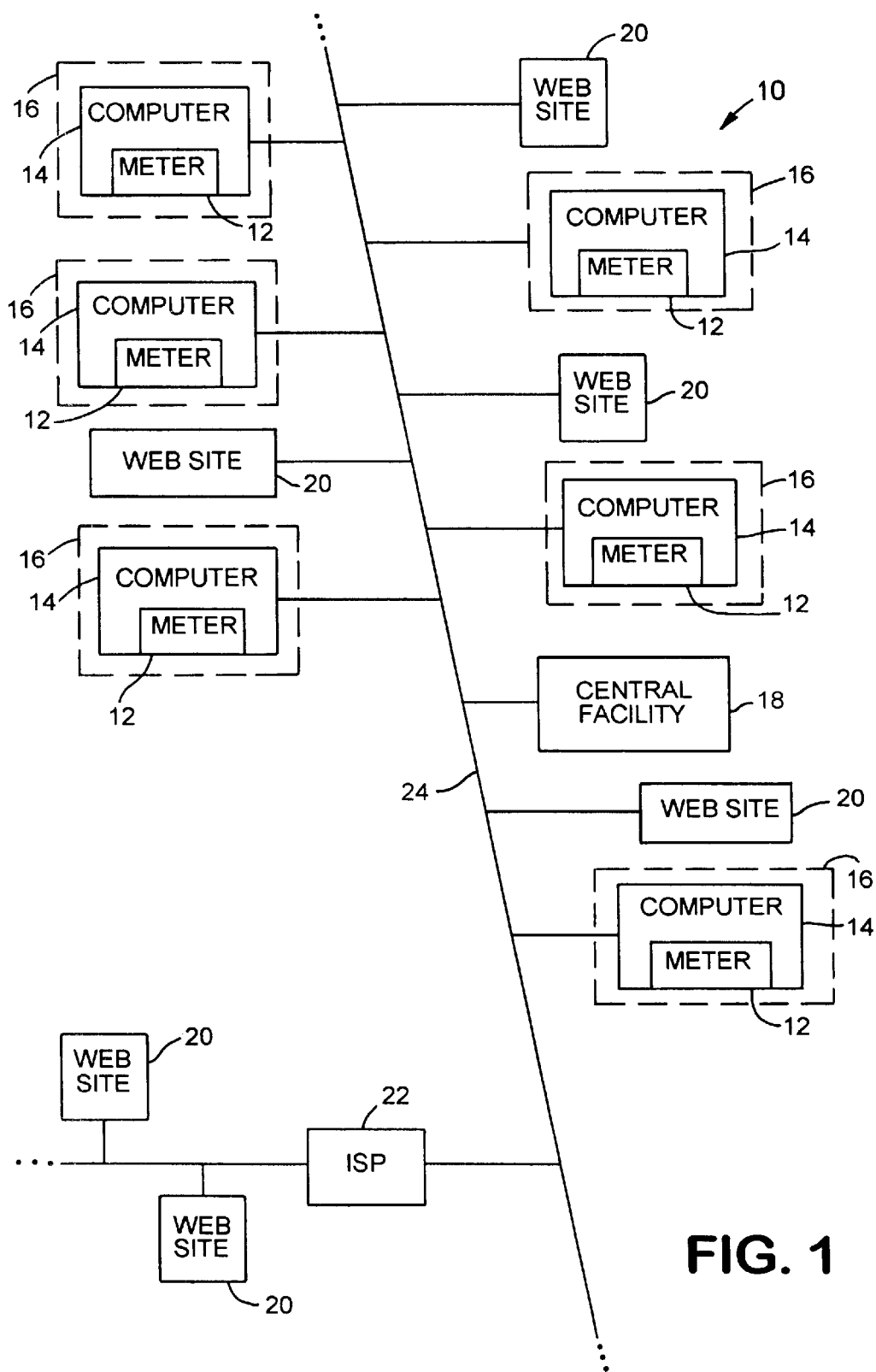
FIG. 1 illustrates a metering system which is in accordance with the present invention and which includes a plurality of meters each of which is resident on a computer at a corresponding statistically selected site.

A metering system 10 is shown in FIG. 1 as an exemplary application of the present invention. The metering system 10 includes a plurality of software meters 12 each of which is installed on a corresponding computer 14. Each of the computers 14 is located at a corresponding content recipient location 16. The content recipient locations 16 may be statistically selected, such as by a data collection site 18, in order to participate in a Web use survey. In this case, these statistically selected content recipient locations 16 may be referred to as a panel. Personnel at the data collection site 18 or elsewhere may implement random digit dialing, for example, in order to find the users of the computers 14 for participation in the Web use survey as members of the panel. The data collection site 18, in some instances, may be referred to as a central facility. As described below, the software meters 12 monitor use of Web sites 20 by corresponding users and provide the resulting metered use data to the data collection site 18 where the data may be assembled into reports for dissemination to interested parties.

As shown in FIG. 1, one or more of the Web sites 20 may be reached through an Internet Service Provider 22. As is typical, the users of the computers 14 reach the Web sites 20 through browsers (not shown) operating on the computers 14. The computers 14, the data collection site 18, the Web sites 20, and the Internet Service Provider 22 are interconnected by a network 24 which, for example, may be a public telephone system, an internal network, or the like.

Figure 2:
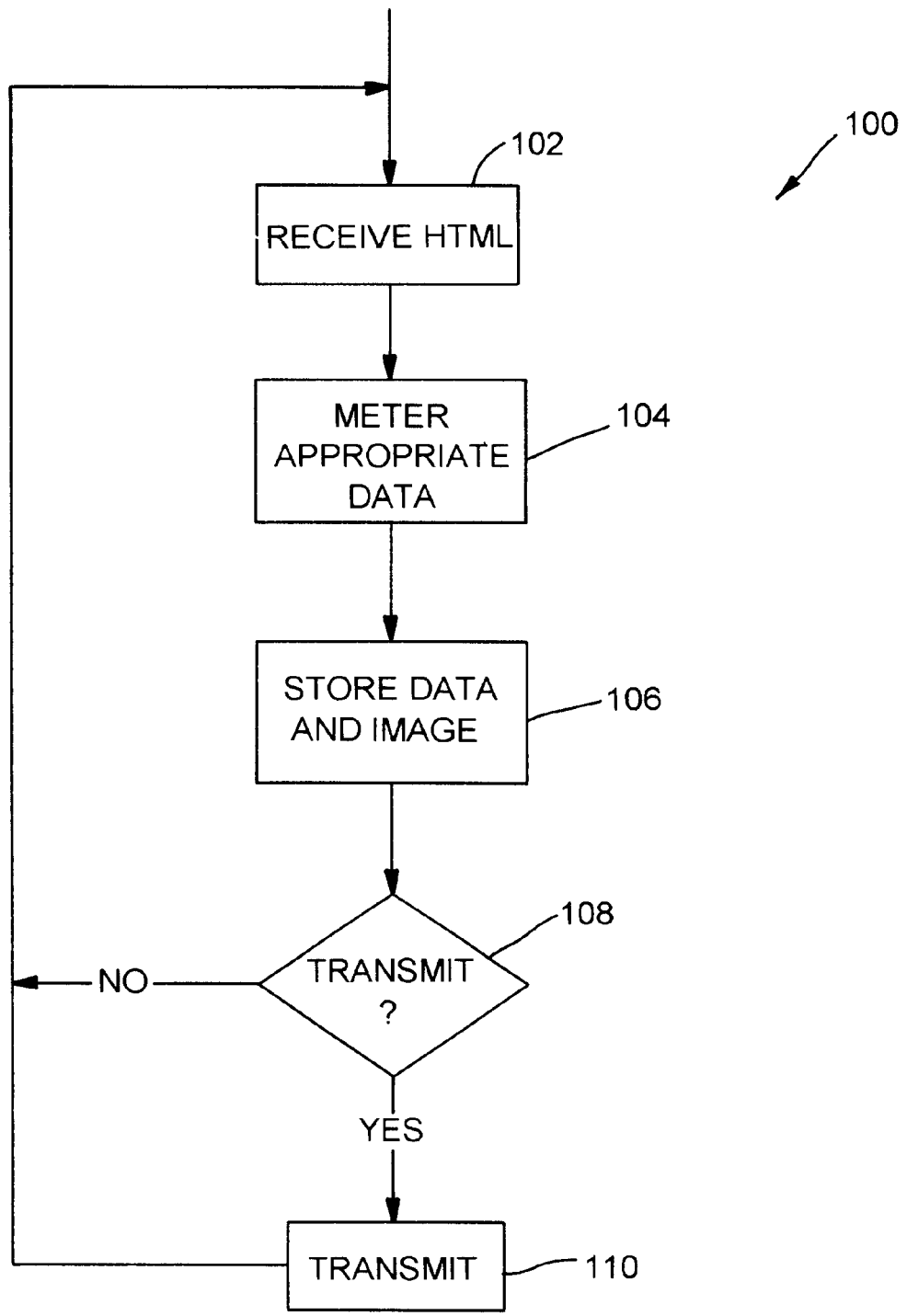
FIG. 2 illustrates a first exemplary embodiment of a software routine which may be used for the meters shown in FIG. 1.

A software routine 100, which may be used in one embodiment for each of the software meters 12, is shown in FIG. 2. When an HTML page is received at a corresponding computer 14 as indicated by a block 102, the software routine 100 at a block 104 meters appropriate data with regard to a user's use of the received HTML page. For example, if the received HTML page includes an advertising banner, the software routine 100 at the block 104 may determine the size of the banner and the location of the banner in the HTML page. Also, the software routine 100 may be arranged at the block 104 to copy the URL of the received HTML page and the URL associated with any image contained in the received HTML page. If the received HTML page has a URL corresponding to a click-through location (which indicates material at one or more Web sites 20 that may be accessed through the received HTML page), the software routine 100 may also be arranged to copy the click-through URL at the block 104. If the received page has a tag which identifies content in the received HTML page, the tag may be copied at the block 104. Moreover, any ALT text associated with the page, and the duration of exposure of the HTML page may also be metered at the block 104. (Exposure may be defined as (i) the amount of the received HTML page that is displayed on the screen of a corresponding computer 14 and (ii) the duration of time that the HTML page is displayed.) ALT text is the text that is displayed in the small pop-up window that appears when a mouse cursor is stopped over an image. The same text is used in place of an image in text-only browsers.

The software routine 100 at a block 106 stores the data metered at the block 104 and also stores any image contained in the received HTML page. Indeed, this data and image may be stored in a portion of the memory of the corresponding computer 14 that is referred to herein as local cache memory. This local cache memory may be under the remote control of the data collection site 18. Accordingly, the data collection server 18, for example, may purge old data and images from the local cache memory of the computer 14. When it is time to transmit the stored data and IMAGES to the data collection site 18 as indicated at a block 108, the software routine 100 at a block 110 transmits the stored data and IMAGES. If it is not time to transmit the stored data and IMAGES, or after the stored data and IMAGES have been transmitted at the block 110, program flow returns to the block 102 to await the reception of another HTML page.

The software routine 100 at the blocks 108 and 110 may transmit the stored data and IMAGES to the data collection site 18 periodically, such as once a day or once a week. Alternatively, the software routine 100 may be arranged to transmit the stored data and IMAGES in response to a poll from the data collection site 18. However, other initiating events may be used at the block 108 in order to determine when to transmit the stored data and IMAGES to the data collection site 18.

Figure 3:
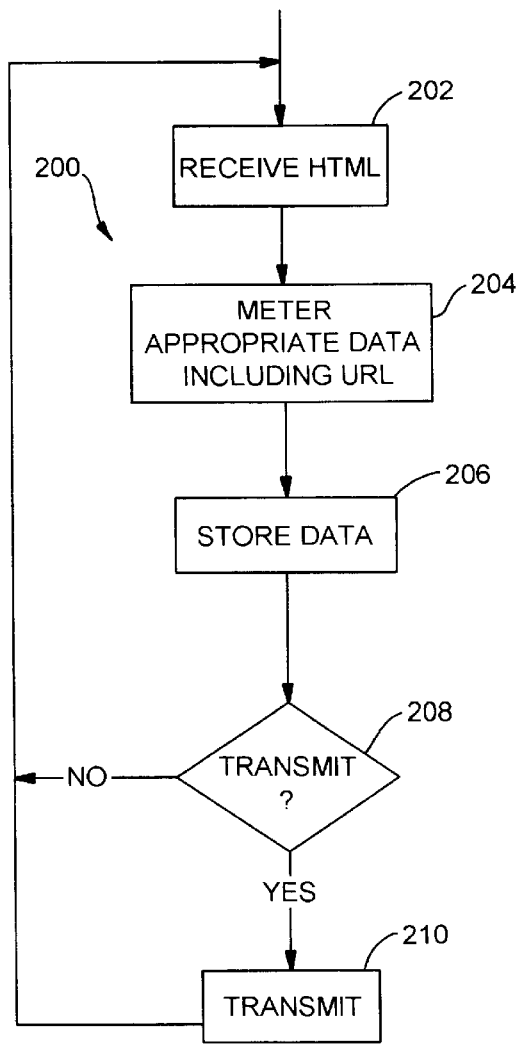
FIG. 3 illustrates a second exemplary embodiment of a software routine which may be used for the meters shown in FIG. 1.
Figure 4:
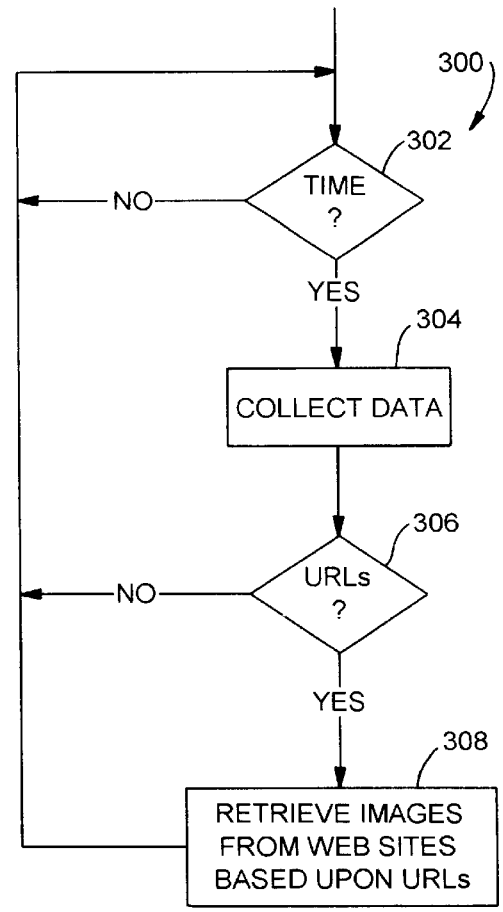
FIG. 4 illustrates a software routine which may be executed by the central facility shown in FIG. 1 in conjunction with the software routine shown in FIG. 3.

Generally, the upstream channel (i.e., the channel from content recipients to content providers) is fairly empty, at least as compared to the downstream channel. However, the transmission to the data collection site 18 of every image of every web page that is viewed by the panelists may over tax the network 24, depending upon the number of panelists and the use they make of the Web. Accordingly, the software routine 100 may be impractical in certain circumstances. Therefore, a software routine 200 as shown in FIG. 3 may instead be provided for the software meters 12.

When an HTML page is received as indicated at a block 202 of the software routine 200, appropriate data are metered at a block 204. This metered data may be of the type described above in connection with the block 104. The software routine 200 at the block 204 is specifically arranged to at least copy the URL which is associated with the received HTML page.

The software routine 200 at a block 206 stores the metered data including the copied URL. When it is time to transmit the stored data as indicated by a block 208, the software routine 200 at a block 210 transmits this data. The timing of the data transmission may be similar to that described above. If it is not time to transmit the stored data and URLs, or after the stored data and URLs have been transmitted at the block 210, program flow returns to the block 202 to await the reception of another HTML page.

The data collection site 18 may execute a software routine 300 in response to the data transmitted by the software routine 200. As indicated by a block 302 of the software routine 300, when it is time to collect the data metered at the content recipient locations 16, the software routine 300 collects that data at a block 304. As discussed above, the timing of data collection imposed at the block 302 may be determined by the corresponding software meter 12, in which case the functions performed at the blocks 302 and 304 by the software routine 300 are passive, i.e., the software routine 300 simply waits for the data to be transmitted by the corresponding software meter 12 and collects that data in an appropriate database. On the other hand, the software routine 300 at the blocks 302 and 304 can itself initiate the data collection (e.g., by polling the software meters 12).

When the data from the content recipient locations 16 corresponding to the software meters 12 have been received, the software routine 300 at a block 306 determines whether there are any URLs in the collected data. If so, the software routine 300 then retrieves from the appropriate Web sites 20 the IMAGES corresponding to each different received URL and stores the retrieved IMAGES in conjunction with the metered data collected from the corresponding content recipient locations 16. In performing this function, the data collection site 18 may sort all URLs received from all content recipient locations 16. Accordingly, if duplicate URLs corresponding to one of the Web sites 20 are received from the content recipient locations 16, the data collection site 18 need only visit this Web site 20 once in order to receive the corresponding image. Thus, the band-width necessary to transmit IMAGES to the data collection site 18 is materially reduced.

However, when the software routine 300 requests IMAGES from one of the Web sites 20 in accordance with the URLs received from the content recipient locations 16, it may or may not get the same IMAGES that were previously provided to the content recipient locations 16 and that were identified by the same URLs. Web site servers sometimes respond with different IMAGES based on the cookie information of the content recipient locations 16, or based on the type of browser used on the computers 14 at the content recipient locations 16, or the IP address of the users at the content recipient locations 16, etc. However, if header information (such as cookie information or browser type) is part of the data metered and stored by the software meters 12 operating on the computers 14 and if this header information is provided to the data collection site 18 by the software meters 12, the data collection site 18 may be arranged to provide the corresponding Web sites with header information, allowing the data collection site 18 to retrieve the same IMAGES that were accessed by the users. Accordingly, the chances of the data collection site 18 retrieving the same IMAGES that were download to the appropriate computer 14 increase.

Thus, the software routine 200 at the block 204 may be arranged to copy header information in conjunction with the metering of the received HTML page. Accordingly, the software routine 300 at the data collection site 18 uses this header information together with the URL of the Web page in order to retrieve the appropriate IMAGES from the Web sites 20.

However, the Web sites 20 may even use the time of day of the content requests from the users at the content recipient locations 16 in order to decide what pages and ad banners to download. Thus, the IMAGES retrieved by the data collection site 18 from the Web sites 20 may not correspond to the IMAGES that were provided by the Web sites 20 to the users at the content recipient locations 16. Also, this image correspondence problem can be exacerbated because the request for the download of an image may come from a machine at the data collection site 18 that has a different IP address than the IP address of the computer 14 operated by the user making the original request.

Figure 5:
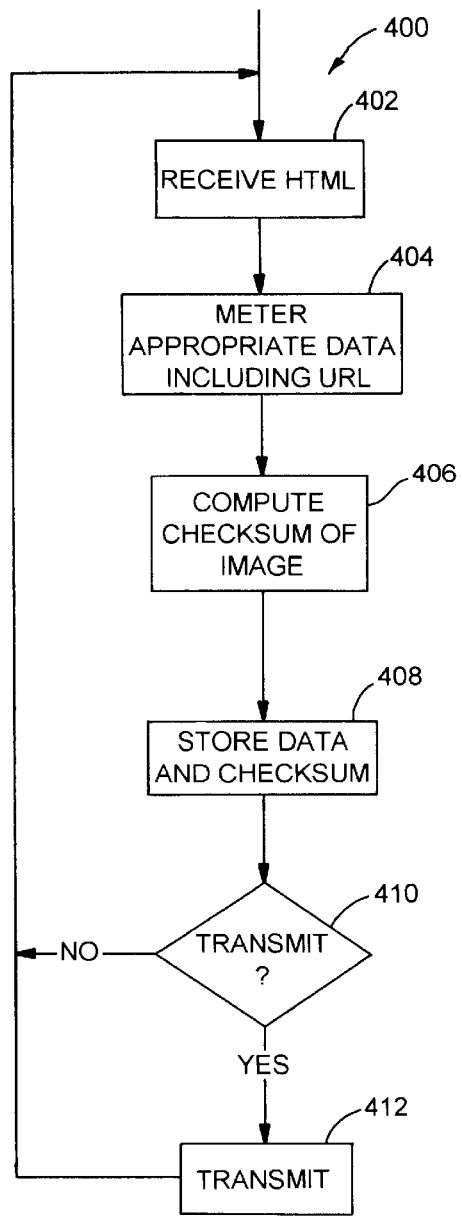
FIG. 5 illustrates a third exemplary embodiment of a software routine which may be used for the meters shown in FIG. 1.

Accordingly, the software meters 12 may execute a software routine 400 shown in FIG. 5. The software routine 400 at a block 402 receives an HTML page. As before, the software routine at a block 404 meters appropriate data, including the URLs corresponding to the received pages. The software meter 400 at a block 406 also computes a checksum of any image contained in the received HTML page. This checksum may be computed in any well known manner and is, in effect, a signature uniquely identifying a corresponding image. The software routine 400 at a block 408 stores the metered data together with the corresponding computed checksums. When it is time to transmit the stored data and computed checksums as indicated by a block 410, this information is transmitted at a block 412.

Figure 6:
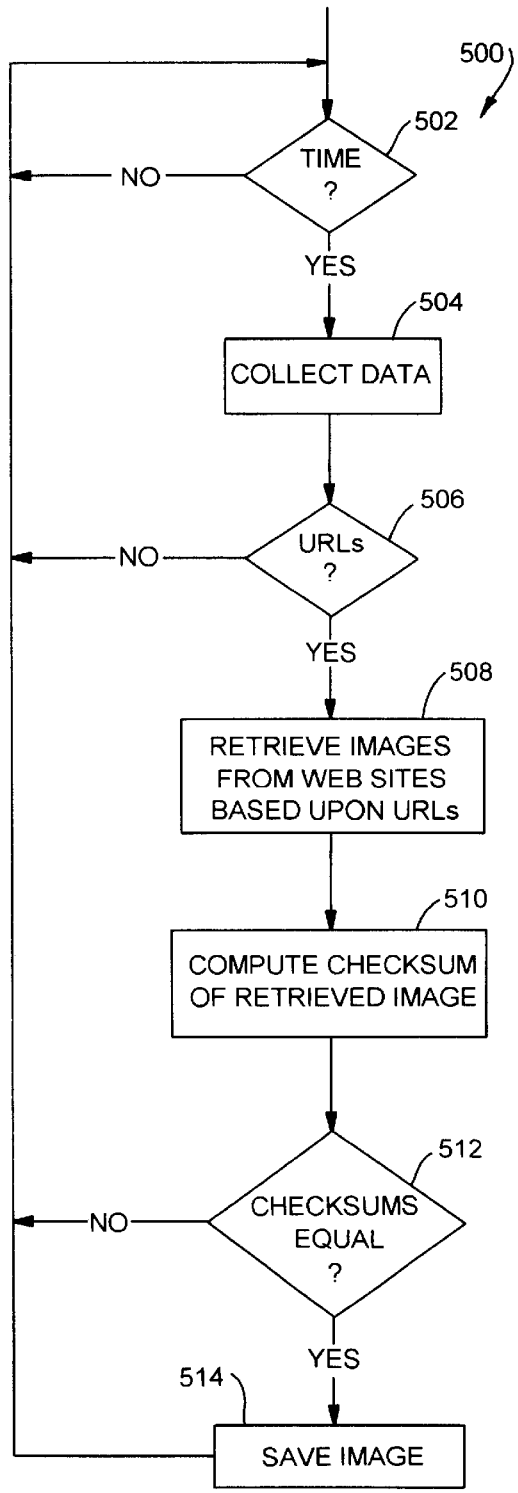
FIG. 6 illustrates a software routine which may be executed by the central facility shown in FIG. 1 in conjunction with the software routine shown in FIG. 5.

In connection with the software routine 400, the data collection site 18 executes a software routine 500 which is shown in FIG. 6. When it is time to collect data from the content recipient locations 16 as indicated at a block 502, the software routine 500 collects this data, including the checksums, at a block 504. As indicated above, data collection may be initiated by the software meters 12, by the data collection site 18, or the like.

If the collected data includes URLs as indicated by a block 506, the software routine 500 at a block 508 eliminates any duplicate URLs, as described above, and retrieves IMAGES from the Web sites 20 corresponding to the remaining URLs. The software routine 500 at a block 510 computes a reference checksum for each of the IMAGES retrieved at the block 508 and, at a block 512, compares the reference checksums with the checksums received from the content recipient locations 16. The software routine 500, at a block 514, saves each image whose reference checksum matches a corresponding checksum received from one of the content recipient locations 16. These IMAGES are saved in a database by user and/or content recipient location identification. The software routine 500 at the block 514 also saves in the database the other collected information under the appropriate user and/or content recipient location identification. If any checksum received from the content recipient locations 16 does not match the reference checksums computed at the block 510, then a suitable notation is made in any reports generated by the data collection site 18 indicating that an image could not be retrieved for the relevant reported information.

This use of a checksum may not address all banners. A banner B that is served only to the IP addresses of entity E is an example. If entity E1 attempts to retrieve the banner B with its own IP address, entity E1 will get something different than the banner B. Therefore, if a checksum computed at the block 510 does not match any checksums received from the content recipient locations 16, the software routine 500 may be arranged to query other databases for banners whose checksums may equal the checksums received from the content recipient locations 16. For example, the software routine 500 may investigate the OMS database or I-PRO's Dispatch Database in order to determine whether these databases contain IMAGES corresponding to the appropriate URLs. If so, these IMAGES can be received and likewise processed at the blocks 510, 512, and 514.

Figure 7:
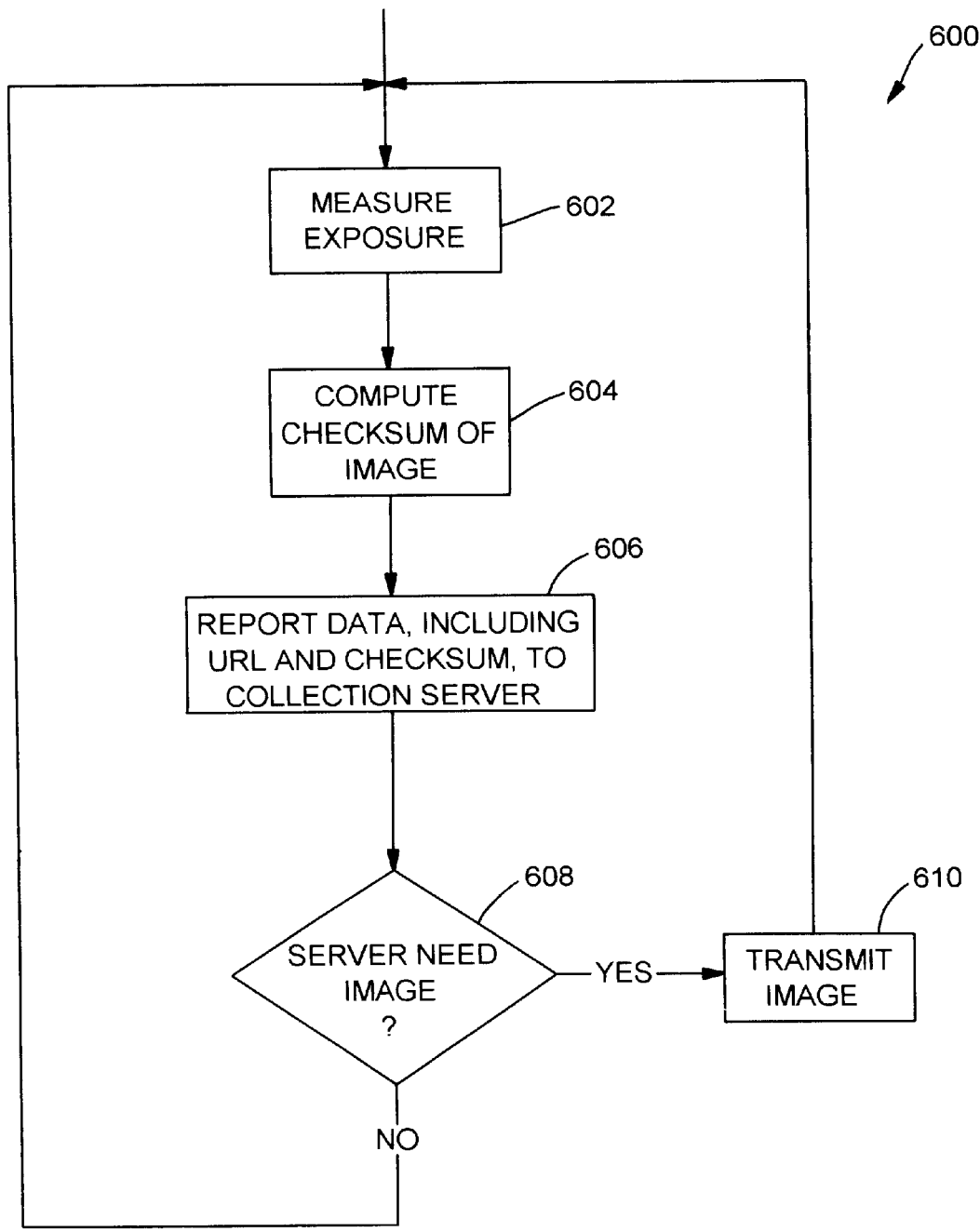
FIG. 7 illustrates a fourth exemplary embodiment of a software routine which may be used for the meters shown in FIG. 1; and, FIGS. 8A and 8B, taken together, illustrate a software routine which may be executed by the central facility shown in FIG. 1 in conjunction with the software routine shown in FIG. 7.

Even this approach may not address all banners. However, by combining some of the approaches described above, the number of banners and other IMAGES covered by the present invention may be significantly increased. This combined approach is indicated by the software routine 600 shown in FIG. 7. The software routine 600 may be used for the software meters 12 and, at a block 602, meters exposure of images contained in HTML received by a corresponding computer 14.

In metering such exposure, the software routine 600 at the block 602 first detects images of interest, such as advertising images. If advertising images are to be detected, the software routine 600 at the block 602 may be arranged to determine whether an object in the HTML has a predetermined size. For example, if the software meters 12 are arranged to meter advertisements, the predetermined size may be any of the sizes specified by the IAB for Internet advertisements. The software routine 600 at the block 602 may also be arranged to detect other characteristics of a file image in order to determine whether the file contains an image of interest. For example, the software routine 600 at the block 602 may be arranged to determine whether the image has an HREF indicating a link to another Web site, whether the HREF is a cgi script URL, whether the HREF contains an identification tag, and/or the like. When an image of interest is so identified, the software routine 600 at the block 602 may be arranged to determine and save the coordinates of the image, to track changes in the coordinates, to track occlusion of the image, and the like. The software routine 600 at the block 602 can also track exposure over time for the image. Accordingly, as the metered content is scrolled into or out of view, the software routine 600 at the block 602 may be arranged to maintain a counter of the on-screen exposure time of the metered image. Similarly, if a window is moved so as to occlude the metered image, the time that the window is in front of the metered image can be deducted from the on-screen exposure time of the metered content. Also, if a browser window is iconified, the time that the browser window is iconified can be deducted from the on-screen exposure of the metered image.

The software routine 600 at a block 604 computes a checksum of the metered image, and reports the exposure data and other data, such as the checksum and any frame URL, image URL, click-through URL, ALT text, and/or identification tag, to the data collection site 18. The software routine 600 at a block 608 then determines if the data collection site 18 needs the image. For example, the data collection site 18 may first determine its need, as discussed below, and then send an instruction, based on that need, to the appropriate software meter 12 requiring this software meter 12 to transmit the image to the data collection site 18. If the data collection site 18 has communicated its need for the image to the software routine 600, the software routine 600 at a block 610 causes the image to be transmitted to the data collection site 18. If the data collection site 18 does not need the image, or after the software routine 600 at the block 610 causes the image to be transmitted to the data collection site 18, program flow returns to the block 602 to await processing of another image.

Figure 8A:
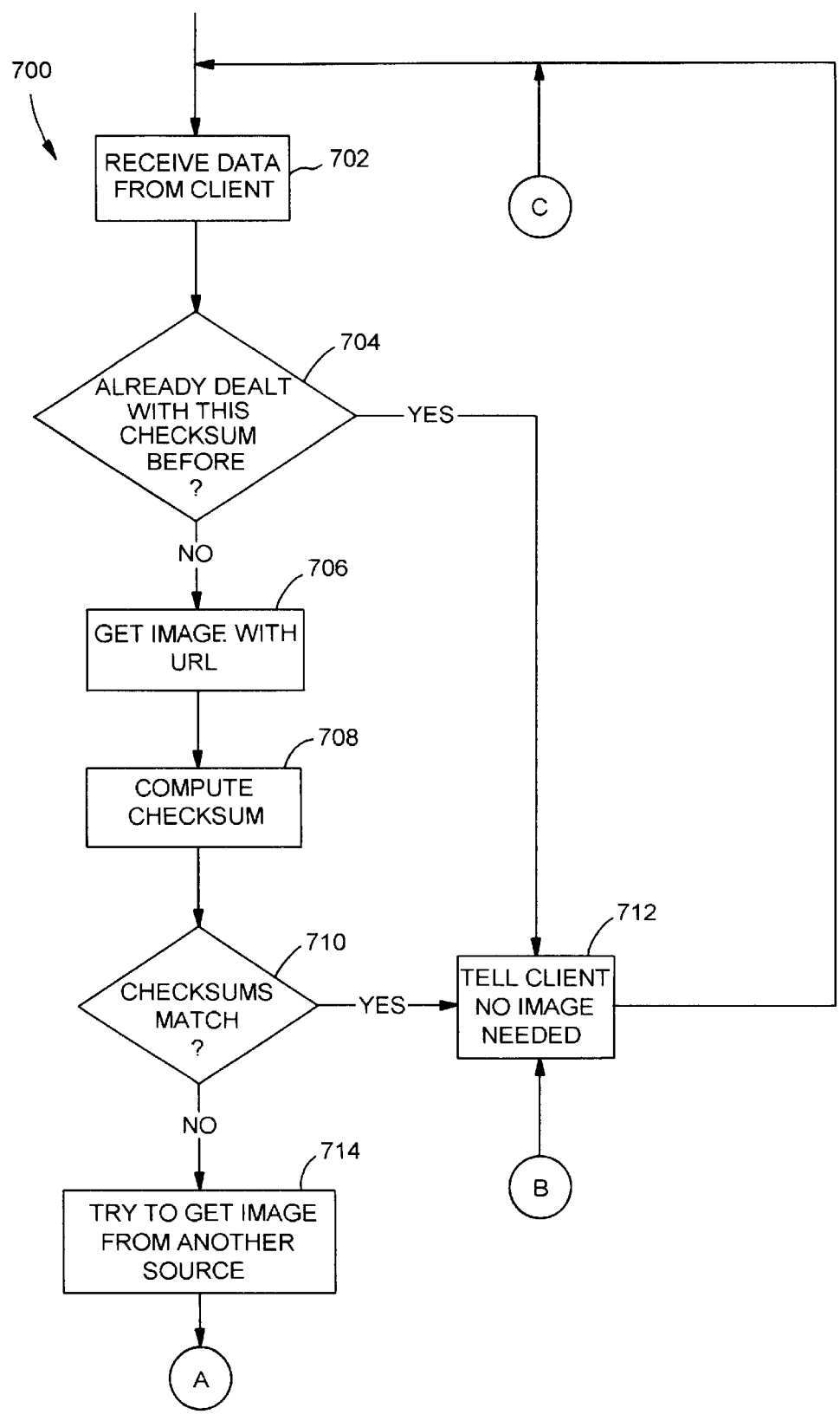
Figure 8B:
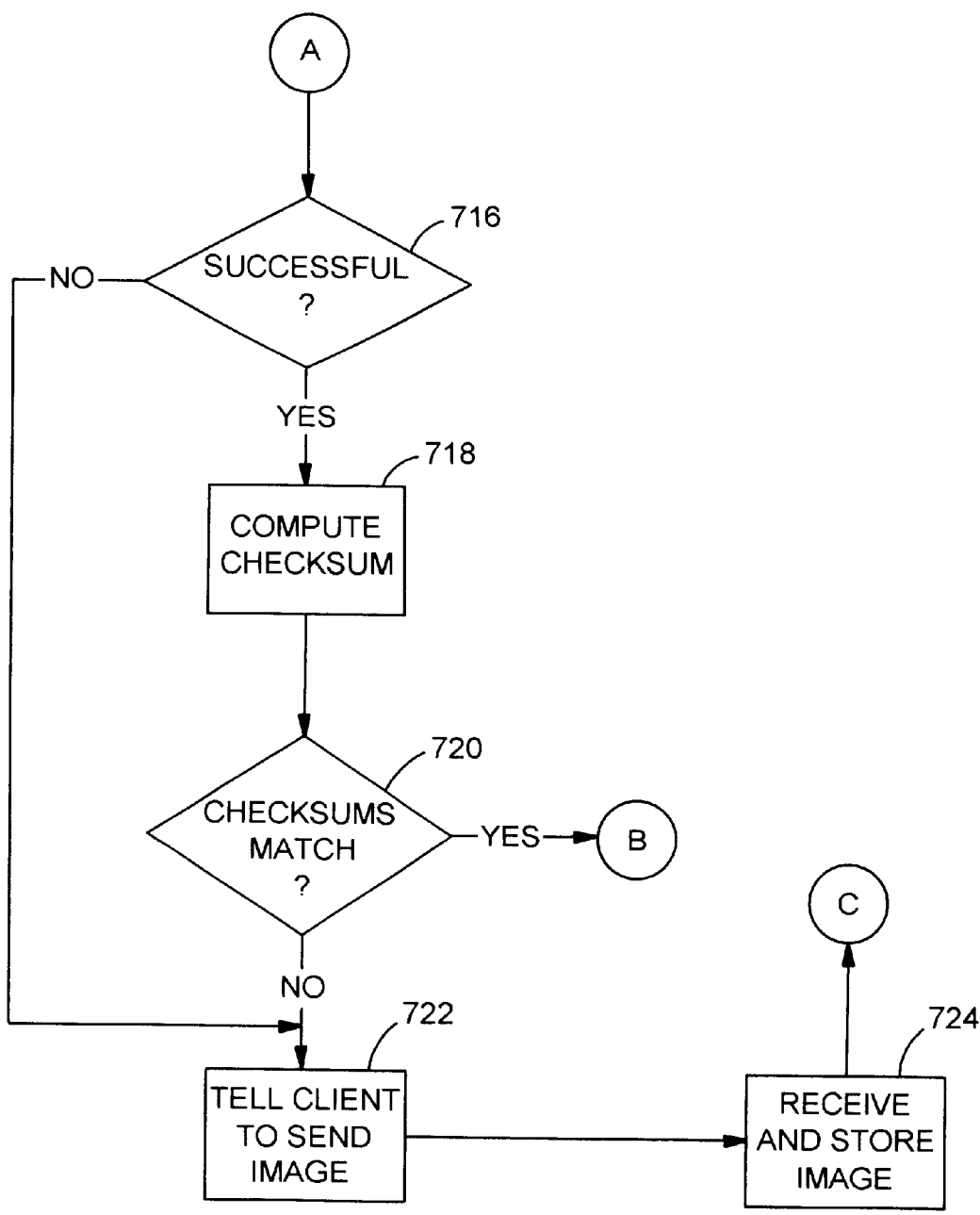

In connection with the software routine 600, the data collection site 18 executes a software routine 700 which is shown in FIGS. 8A and 8B. When the data collection site 18 receives data transmitted at the block 610 from the computer 14 located at one of the content recipient locations 16 (i.e., the client) as indicated by a block 702, the software routine 700 at a block 704 determines whether it has already dealt with the checksum contained in this data. For example, the software routine 700 at the block 704 may compare the checksum just received with the reference checksums that it has previously processed and stored. Indeed, the data collection site 18 may maintain a library of previously processed reference checksums and their corresponding IMAGES that it has previously retrieved.

If the software routine 700 at a block 704 determines whether it has not already dealt with the checksum contained in the data just received, the software routine 700 at a block 706 retrieves the image from the Web site 20 corresponding to the URL contained in the data just received. At a block 708, the software routine 700 computes a reference checksum for any retrieved image. At a block 710, the software routine 700 compares the reference checksum computed at the block 708 with the checksum contained in the data received from the client at the block 702. If the software routine 700 at the block 704 determines that it has already dealt with the checksum contained in the data received from the client at the block 702, or if the reference checksum computed at the block 708 matches the checksum contained in the data received from the client at the block 702, the software routine 700 at a block 712 transmits a message to the client indicating that the data collection site 18 does not need the image from the client.

However, if the reference checksum computed at the block 708 does not match the checksum contained in the data received from the client at the block 702, the software routine 700 at a block 714 attempts to retrieve the image from another source, i.e., a source other than the Web site corresponding to the URL. Such other source, for example, may be the OMS database or I-PRO's Dispatch Database referred to above. If the image can be retrieved from another source as indicated by the block 716, the software routine 700 at a block 718 computes a checksum from this image and, at a block 720, compares the checksum computed at the block 178 to the checksum received from the client at the block 702. If the reference checksum computed at the block 718 matches the checksum just received from the client at the block 702, the software routine 700 at the block 712 transmits a message to the client indicating that the data collection site 18 does not need the image from the client.

However, if the reference checksum computed at the block 718 does not match the checksum received from the client at the block 702, or if an image could not be retrieved from another source as indicated by the block 716, the software routine 700 at a block 722 transmits a message to the client indicating that the client should transmit the image to the data collection site 18. At a block 724, the software routine 700 receives and stores the image transmitted by the client in response to the message transmitted at the block 722. After the software routine 700 at the block 712 transmits a message to the client indicating that the data collection site 18 does not need the image from the client, or after the software routine 700 at the block 724 receives and stores an image from the client, program flow return to the block 702 to process more data.

Thus, the data collection site 18 receives the correct images in all cases. Also, the bandwidth that is used to achieve the retrieval of these images is materially reduced. That is, the only time that a banner will be sent upstream from one of the content recipient locations 16 to the data collection site 18 is the very first time it is viewed by any member of the panel, and even in that case the transfer will only be necessary if the banner cannot be retrieved by the data collection site 18 directly from some other, more efficient source.

Certain modifications of the present invention have been discussed above. Other modifications will occur to those practicing in the art of the present invention. For example, a single data collection site 18 is shown in FIG. 1. However, it should be understood that more than one data collection site 18 may be used to collect data, as desired.

Also, although the term checksum is used herein, it should be understood that a checksum could be a signature or any other identifier by which content can be uniquely identified.

Moreover, the software meters 12 are installed on corresponding computers 14 at the statistically selected content recipient locations 16 which may be referred to above as a panel. Instead, the software meters 12 may be installed on the corresponding computers 14 of a subset of this panel. The remaining members of the panel may have software meters which do not have the capability of providing images back to the data collection site 18.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method performed at a content recipient on a network, the method comprising the following steps:
    a) receiving an image from a Web site over the network;
    b) computing, at the content recipient, a checksum from the received image, the content recipient not being the original network source of the received image;
    c) transmitting the checksum from the content recipient to a data collection site over the network; and,
    d) transmitting the image from the content recipient to the data collection site over the network in response to a message from the data collection site indicating that the content recipient should transmit the image.

2. The method of claim 1 wherein step a) comprises the step of detecting an image in information downloaded from a Web site based upon size.

3. The method of claim 1 wherein step a) comprises the step of detecting an image in information downloaded from a Web site based upon an ID associated with the image.

4. The method of claim 1 wherein step a) comprises the step of detecting an image in information downloaded from a Web site based upon a URL associated with the image.

5. The method of claim 1 wherein step a) comprises the step of detecting an image in information downloaded from a Web site based upon a click-through URL associated with the image.

6. The method of claim 1 wherein step c) comprises the step of transmitting to the data collection site non-checksum information related to the image.

7. The method of claim 6 wherein the non-checksum information includes a size of the image.

8. The method of claim 6 wherein the non-checksum information includes a location of the image on a page.

9. The method of claim 8 wherein the non-checksum information includes a URL of a page containing the image.

10. The method of claim 6 wherein the non-checksum information includes a URL of the image.

11. The method of claim 6 wherein the non-checksum information includes a URL of a click-through location.

12. The method of claim 6 wherein the non-checksum information includes an identification tag which identifies the image.

13. The method of claim 6 wherein the non-checksum information includes ALT text relating to the image.

14. The method of claim 6 wherein the non-checksum information includes duration of image exposure.

15. A method performed at a data collection site on a network, the method comprising the following steps:
    a) receiving a checksum from a content recipient over the network, wherein the checksum is related to an image transmitted to the content recipient over the network, and wherein the checksum is computed at the content recipient, and wherein the content recipient is not the original network source of the transmitted image;
    b) comparing a reference checksum to the received checksum;
    c) if the received and reference checksums do not match, transmitting to the content recipient over the network a message from the data collection site indicating that the content recipient should transmit the image; and,
    d) receiving the image from the content recipient over the network in response to step c).

16. The method of claim 15 wherein step b) comprises the following steps:
    retrieving a reference image from a Web site; and,
    computing the reference checksum from the reference image.

17. The method of claim 15 wherein step c) comprises the following steps:
    c1) if the received and reference checksums do not match, retrieving the image from a source other than the content recipient;
    c2) if the image cannot be successfully retrieved from the source, transmitting to the content recipient the message from the data collection site indicating that the content recipient should transmit the image.

18. The method of claim 15 wherein step a) comprises the step of receiving non-checksum information related to the image.

19. The method of claim 18 wherein the non-checksum information includes a size of the image.

20. The method of claim 18 wherein the non-checksum information includes a location of the image on a page.

21. The method of claim 18 wherein the non-checksum information includes a URL of a page containing the image.

22. The method of claim 18 wherein the non-checksum information includes a URL of the image.

23. The method of claim 18 wherein the non-checksum information includes a URL of a click-through location.

24. The method of claim 18 wherein the non-checksum information includes an identification tag which identifies the image.

25. The method of claim 18 wherein the non-checksum information includes ALT text relating to the image.

26. The method of claim 18 wherein the non-checksum information includes duration of image exposure.

27. The method of claim 15 wherein step b) comprises the step of accessing the image from memory at the data collection site if the received and reference checksums match.

28. The method of claim 27 wherein the step of accessing the image from memory comprises the step of accessing the image from memory based upon the received checksum.

29. The method of claim 15 wherein step b) comprises the step of retrieving the reference checksum from memory.

30. The method of claim 29 wherein step c) comprises the step of retrieving the image from memory if the reference checksum and the received checksum match.

31. A method performed at a data collection site on a network, the method comprising:
   a) receiving a first image identifier from a content recipient over the network, wherein the first image identifier is related to a first image transmitted to the content recipient, and wherein the content recipient is not the original network source of the first image, and wherein the first image identifier includes a checksum related to the first image;
   b) receiving a second image over the network from a source other than the content recipient based upon the first image identifier;
   c) determining a second image identifier corresponding to the second image, wherein the second image identifier includes a checksum related to the second image;
   d) saving the second image in connection with the content recipient if the first and second image identifiers match;
   e) if the first and second image identifiers do not match, transmitting to the content recipient over the network a message from the data collection site indicating that the content recipient should transmit the first image; and,
   f) receiving the first image from the content recipient over the network in response to the message.

32. The method of claim 31 wherein the source is a memory of the data collection site.

33. The method of claim 31 wherein the source is a Web site from which the content recipient received the first image.

34. The method of claim 31 wherein the source is a third party other than the content recipient and a Web site from which the content recipient received the first image.

35. The method of claim 31 wherein the first and second image identifiers comprise corresponding checksums.

36. The method of claim 31 wherein the first identifier comprises a URL.

* * * * *